US010176159B2

(12) United States Patent
Vohra et al.

(10) Patent No.: US 10,176,159 B2
(45) Date of Patent: Jan. 8, 2019

(54) IDENTIFY DATA TYPES AND LOCATIONS OF FORM FIELDS ENTERED BY DIFFERENT PREVIOUS USERS ON DIFFERENT COPIES OF A SCANNED DOCUMENT TO GENERATE AN INTERACTIVE FORM FIELD

(71) Applicant: Adobe Systems Incorporated, San Jose, CA (US)

(72) Inventors: Lalit Vohra, New Delhi (IN); Yash Kumar Gupta, Agra (IN); Aditya Kumar Pandey, New Delhi (IN); Mohit Bansal, Bareilly (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 439 days.

(21) Appl. No.: 14/269,233

(22) Filed: May 5, 2014

(65) Prior Publication Data
US 2015/0317296 A1 Nov. 5, 2015

(51) Int. Cl.
*G06F 17/24* (2006.01)
*G06F 17/30* (2006.01)

(52) U.S. Cl.
CPC ...... *G06F 17/243* (2013.01); *G06F 17/30011* (2013.01)

(58) Field of Classification Search
CPC .................................................. G06F 17/243
USPC ................ 715/221, 222, 223, 224, 225, 226
See application file for complete search history.

(56) References Cited

U.S. PATENT DOCUMENTS

| | | | | |
|---|---|---|---|---|
| 5,060,980 A | * | 10/1991 | Johnson | G06F 17/243 283/115 |
| 5,420,974 A | * | 5/1995 | Morris | G06F 17/243 715/236 |
| 6,094,505 A | * | 7/2000 | Lech | G06K 9/2054 382/180 |
| 6,360,951 B1 | * | 3/2002 | Swinehart | G06K 9/00469 235/462.07 |
| 6,456,740 B1 | * | 9/2002 | Carini | G06K 9/2054 178/18.01 |
| 7,216,292 B1 | * | 5/2007 | Snapper | G06F 17/243 715/234 |
| 7,289,685 B1 | * | 10/2007 | Wolff | G06K 9/00449 283/70 |
| 7,343,551 B1 | * | 3/2008 | Bourdev | G06F 17/243 715/224 |
| 7,529,408 B2 | * | 5/2009 | Vohariwatt | G06K 9/00469 382/180 |
| 7,573,594 B2 | * | 8/2009 | Leslie | G06F 17/30067 358/1.15 |
| 7,685,522 B1 | * | 3/2010 | Feuerman | G06F 17/243 715/202 |

(Continued)

*Primary Examiner* — Cesar B Paula
*Assistant Examiner* — Yahao Chen
(74) *Attorney, Agent, or Firm* — Keller Jolley Preece

(57) ABSTRACT

A computer implemented method and apparatus for detecting, validating, and correlating form-fields in a scanned document. The method comprises displaying a plurality of interactive form-fields associated with a scanned document, wherein each interactive form-field in the plurality of form-fields is defined by a location in the document where one or more previous users entered information on the scanned document, and a data type for the entered information.

20 Claims, 12 Drawing Sheets

(56) References Cited

U.S. PATENT DOCUMENTS

| | | | |
|---|---|---|---|
| 8,180,799 B1* | 5/2012 | Healy | G06F 17/243 707/791 |
| 9,652,445 B2* | 5/2017 | Balamurugan | G06F 17/243 |
| 2002/0156846 A1* | 10/2002 | Rawat | G06F 17/243 709/203 |
| 2003/0188262 A1* | 10/2003 | Maxwell | G06F 17/2247 715/209 |
| 2004/0049740 A1* | 3/2004 | Petersen | G06F 17/243 715/221 |
| 2004/0190790 A1* | 9/2004 | Zuev | G06K 9/00463 382/291 |
| 2005/0234851 A1* | 10/2005 | King | H04N 1/00244 |
| 2005/0275893 A1* | 12/2005 | Korn | G06F 17/243 358/1.18 |
| 2005/0276520 A1* | 12/2005 | Leslie | G06F 17/30067 382/306 |
| 2005/0289114 A1* | 12/2005 | Bellamy | G06F 17/30011 |
| 2006/0007189 A1* | 1/2006 | Gaines, III | G06F 17/243 345/179 |
| 2006/0050996 A1* | 3/2006 | King | H04N 1/00244 382/312 |
| 2006/0061806 A1* | 3/2006 | King | H04N 1/00244 358/1.15 |
| 2007/0089049 A1* | 4/2007 | Gormish | G06F 17/24 715/224 |
| 2007/0168382 A1* | 7/2007 | Tillberg | G06F 17/30253 |
| 2007/0256005 A1* | 11/2007 | Schneider | G06F 17/2235 |
| 2008/0104508 A1* | 5/2008 | Lumley | G06F 17/248 715/255 |
| 2008/0144106 A1* | 6/2008 | Ben-David | G06F 17/243 358/1.18 |
| 2008/0285792 A1* | 11/2008 | Comay | G06F 17/243 382/100 |
| 2009/0029336 A1* | 1/2009 | Mangano | G09B 7/00 434/354 |
| 2009/0049375 A1* | 2/2009 | Aughenbaugh | G06F 17/242 715/253 |
| 2009/0187598 A1* | 7/2009 | Vohariwatt | G06K 9/00469 |
| 2009/0204881 A1* | 8/2009 | Murthy | G06F 17/243 715/226 |
| 2009/0226090 A1* | 9/2009 | Okita | G06K 9/00442 382/187 |
| 2010/0182631 A1* | 7/2010 | King | G06F 17/243 358/1.15 |
| 2010/0241642 A1* | 9/2010 | Tordella | G06F 17/243 707/758 |
| 2011/0078216 A1* | 3/2011 | Healy | G06F 17/30595 707/812 |
| 2011/0214067 A1* | 9/2011 | Tanaka | G06F 17/243 715/745 |
| 2011/0255107 A1* | 10/2011 | Blau | G06F 17/243 358/1.11 |
| 2011/0271173 A1* | 11/2011 | Ait-Mokhtar | G06F 17/243 715/226 |
| 2012/0063684 A1* | 3/2012 | Denoue | G06F 17/243 382/175 |
| 2012/0166929 A1* | 6/2012 | Henderson | G06F 17/243 715/224 |
| 2012/0192097 A1* | 7/2012 | Chang | G06F 9/4443 715/780 |
| 2012/0226969 A1* | 9/2012 | Begole | G06F 17/243 715/226 |
| 2012/0314954 A1* | 12/2012 | Moore | G06K 9/00449 382/182 |
| 2013/0031145 A1* | 1/2013 | Luo | G06F 17/30876 707/812 |
| 2013/0061124 A1* | 3/2013 | Patton | G06F 17/243 715/224 |
| 2013/0097480 A1* | 4/2013 | Allison | G06Q 10/10 715/223 |
| 2013/0201534 A1* | 8/2013 | Carlen | G06F 3/048 358/450 |
| 2013/0226952 A1* | 8/2013 | Lal | G06F 17/30899 707/767 |
| 2013/0236110 A1* | 9/2013 | Barrus | G06K 9/00463 382/224 |
| 2013/0238965 A1* | 9/2013 | Barrus | G06K 9/00449 715/223 |
| 2013/0238966 A1* | 9/2013 | Barrus | G06K 9/00449 715/223 |
| 2013/0290347 A1* | 10/2013 | Saib | G06F 17/30867 707/748 |
| 2014/0040717 A1* | 2/2014 | Piratla | G06F 17/243 715/221 |
| 2014/0059414 A1* | 2/2014 | He | G06K 9/00449 715/222 |
| 2014/0223277 A1* | 8/2014 | Kimber | G06F 17/2247 715/223 |
| 2014/0237342 A1* | 8/2014 | King | G06F 17/30876 715/224 |
| 2014/0258826 A1* | 9/2014 | Barrus | G06F 17/243 715/224 |
| 2014/0258830 A1* | 9/2014 | Gormish | G06F 17/243 715/226 |
| 2014/0281871 A1* | 9/2014 | Brunner | G06F 17/243 715/226 |
| 2014/0359418 A1* | 12/2014 | Balamurugan | G06F 17/243 715/222 |
| 2014/0372860 A1* | 12/2014 | Craven | G06F 17/24 715/222 |
| 2014/0380141 A1* | 12/2014 | Craven | G06F 17/24 715/222 |
| 2015/0033107 A1* | 1/2015 | Xiong | G06F 17/2294 715/225 |
| 2015/0095753 A1* | 4/2015 | Gajera | G06F 17/248 715/226 |
| 2015/0129653 A1* | 5/2015 | Gupta | G06F 17/30011 235/375 |
| 2015/0248393 A1* | 9/2015 | Watanabe | G06F 17/243 715/226 |
| 2015/0317295 A1* | 11/2015 | Sherry | G06F 17/218 715/226 |
| 2015/0319198 A1* | 11/2015 | Gupta | H04L 65/403 715/753 |
| 2017/0046324 A1* | 2/2017 | Hu | G06F 17/243 |

* cited by examiner

| RECORD NO. 502 | DOC. ID 504 | PAGE NO. 506 | FORM FIELD ID 508 | USER ID 510 | DIMENSIONS 512 | TYPE 514 | PROFILE FIELD NAME 516 | SEQUENCE ORDER 518 |
|---|---|---|---|---|---|---|---|---|
| 1 | 1100 | 1 | 1102.1 | user1@adobe.com | [12,34,60,100] | TEXT | FIRST NAME | 1104.1 |
| 2 | 1100 | 1 | 1102.2 | user2@adobe.com | [16,36,64,102] | TEXT | FIRST NAME | 1104.2 |
| 3 | 1100 | 1 | 1104.1 | user1@adobe.com | [29,35,60,120] | TEXT | LAST NAME | 1106.1 |
| 4 | 1100 | 1 | 1104.2 | user2@adobe.com | [33,39,64,124] | TEXT | LAST NAME | 1108.1 |
| 5 | 1100 | 1 | 1106.1 | user1@adobe.com | [70,95,80,120] | CHECK | NONE | 1110.1 |
| 6 | 1100 | 1 | 1108.1 | user2@adobe.com | [90,95,100,120] | CHECK | NONE | |
| 7 | 1100 | 1 | 1110.1 | user1@adobe.com | [12,114,60,144] | TEXT | NONE | 1112.1 |
| 8 | 1100 | 1 | 1112.1 | user1@adobe.com | [12,154,60,184] | ATTACHMENT | NONE | |

| FIELDS | USER A | USER B | USER C |
|---|---|---|---|
| 1 | A1 | B1 | C1 |
| 2 | A2 | NIL | C2 |
| 3 | A3 | NIL | C3 |
| 4 | NIL | B2 | NIL |
| 5 | NIL | B3 | NIL |
| 6 | NIL | B4 | NIL |

| FIELD | 1 | 2 | 3 | 4 | 5 | 6 |
|---|---|---|---|---|---|---|
| 1 | N/A | 2/3 | 2/3 | 1/3 | 1/3 | 1/3 |
| 2 | 2/2 | N/A | 2/2 | 0/2 | 0/2 | 0/2 |
| 3 | 2/2 | 2/2 | N/A | 0/2 | 0/2 | 0/2 |
| 4 | 1/1 | 0/1 | 0/1 | N/A | 1/1 | 1/1 |
| 5 | 1/1 | 0/1 | 0/1 | 1/1 | N/A | 1/1 |
| 6 | 1/1 | 0/1 | 0/1 | 1/1 | 1/1 | N/A |

FIG. 8

| RECORD NO. | DOC. ID | PAGE NO. | FORM FIELD ID | DIMENSIONS | TYPE | PROFILE FIELD NAME | SEQUENCE ORDER | AUTO FILL | VALUE | CORRELATED ATTACHMENT | POSITIVE CORRELATIONS | NEG. CORRELATIONS |
|---|---|---|---|---|---|---|---|---|---|---|---|---|
| 1 | 1100 | 1 | 1114 | [12,34,60,100] | TEXT | FIRST NAME | 1116 | YES | FRANKLIN | | | |
| 2 | 1100 | 1 | 1116 | [29,35,60,120] | TEXT | LAST NAME | | YES | SMITH | | | |
| 3 | 1100 | 1 | 1122 | [70,95,80,120] | CHECK | NONE | 1124 | NO | | | [1124, 1126] | [1123] |
| 4 | 1100 | 1 | 1123 | [90,95,100,120] | CHECK | NONE | | NO | | | | [1122, 1124, 1126] |
| 5 | 1100 | 1 | 1124 | [12,114,60,144] | TEXT | NONE | 1126 | NO | | [1126] | [1122, 1126] | [1123] |
| 6 | 1100 | 1 | 1126 | [12,154,60,184] | ATTACHMENT | NONE | | NO | | | [1124] | |

EMPLOYMENT_FORM.JPG

FIRST NAME: _____ ⌒— 1102

LAST NAME: _____ ⌒— 1104

MAILING ADDRESS: _____

CITY: _____

STATE: _____

ZIP CODE: _____

CELL PHONE: _____ HOME PHONE: _____

DO YOU HAVE A VALID DRIVER'S LICENSE?: ☐ YES ☐ NO   1110

IF YES, PLEASE PROVIDE DRIVER,S LICENSE NUMBER: _____

PLEASE ATTACH A COPY OF DRIVER'S LICENSE HERE: _____ 1112

1106  1108

| SUBMIT |

EMPLOYMENT_FORM

FIRST NAME: [FRANKLIN] — 1114

LAST NAME: [SMITH] — 1116

MAILING ADDRESS: [          ]

CITY: [      ]

STATE: [      ]

ZIP CODE: [      ]

CELL PHONE: [      ]   HOME PHONE: [      ]

DO YOU HAVE A VALID DRIVER'S LICENSE?: ☐ YES ☐ NO    1118

IF YES, PLEASE PROVIDE DRIVER,S LICENSE NUMBER: [      ]

PLEASE ATTACH A COPY OF DRIVER'S LICENSE HERE: [      ]

[SUBMIT]                                            1120

EMPLOYMENT_FORM

FIRST NAME: FRANKLIN

LAST NAME: SMITH

MAILING ADDRESS: 123 ELM STREET

CITY: OLD TOWN

STATE: NY

ZIP CODE: 11011

CELL PHONE: [ ]  HOME PHONE: [ ]

DO YOU HAVE A VALID DRIVER'S LICENSE?: ☒ YES ☐ NO  1122 1123

IF YES, PLEASE PROVIDE DRIVER,S LICENSE NUMBER: [ ] 1124

PLEASE ATTACH A COPY OF DRIVER'S LICENSE HERE: [ ] 1126

SUBMIT — 1128

FIG. 11C

IDENTIFY DATA TYPES AND LOCATIONS OF FORM FIELDS ENTERED BY DIFFERENT PREVIOUS USERS ON DIFFERENT COPIES OF A SCANNED DOCUMENT TO GENERATE AN INTERACTIVE FORM FIELD

BACKGROUND OF THE INVENTION

Field of the Invention

Embodiments of the present invention generally relate to interactive documents and, more particularly, to techniques for detecting, validating, and correlating form-fields in a scanned document.

Description of the Related Art

Online form filling solutions have become commonplace. Companies, such as ADOBE Systems Incorporated of San Jose, Calif. provide solutions, for example, FormsCentral and LIVECYCLE forms for authoring forms, distributing forms, and collecting data from users who fill out the forms online. Most form-filling solutions provide interactive forms. However, many scanned (i.e., non-interactive or flat) forms already exist. It requires a significant amount of effort to create interactive versions of the existing scanned form documents. Currently, optical character recognition (OCR) algorithms are used to detect the presence of fields in scanned form documents, however, OCR algorithms are notoriously unreliable and inconsistent, and fail to identify a data type of a field or provide suggestions for or validation of field entries. In addition, OCR algorithms fail to provide correlation of related fields. Therefore, there is a need for a method and apparatus for detecting, validating, and correlating form-fields in a scanned document.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for detecting, validating, and correlating form-fields in a scanned document is described. The method comprises displaying a plurality of interactive form-fields associated with a scanned document. Each interactive form-field in the plurality of form-fields is defined by a location in the document where one or more previous users entered information on the scanned document, and also defined by a data type for the entered information.

According to one embodiment, a method for detecting, validating and correlating form fields includes accessing a scanned document by an electronic device and determining form fields for the scanned document based on subsequent interactions with the scanned document by at least one other user. The determining comprises fetching location information corresponding to at least one location where the at least one other user entered information on the scanned document. The method further includes fetching data type information for data filled in the form fields by the at least one other user and either identifying or generating form fields using the fetched location information and fetched data type information. The method further comprises causing display of a plurality of interactive form-fields associated with the scanned document.

In another embodiment, an apparatus for detecting, validating, and correlating form-fields in a scanned document is described. The apparatus comprises a suggestion module for displaying a plurality of interactive form-fields associated with a scanned document. Each interactive form-field in the plurality of form-fields is defined by (i) a location in the document where one or more previous users entered information on the scanned document, and (ii) a data type for the entered information.

In yet another embodiment, a non-transient computer readable medium for detecting, validating, and correlating form-fields in a scanned document is described. The computer readable medium stores computer instructions that, when executed by at least one processor causes the at least one processor to perform the method for detecting, validating, and correlating form-fields in a scanned document.

BRIEF DESCRIPTION OF THE DRAWINGS

FIG. 5 illustrates an exemplary field table, according to one or more embodiments;

FIG. 7 depicts an example of a table that identifies what information was entered by users in which fields of a document, according to one or more embodiments;

FIG. 8 depicts an example of a table 700 that identifies a number of times each field co-exists with respect to every other field in a response, according to one or more embodiments;

FIG. 10 illustrates the information used to create form-fields on a scanned document, according to one or more embodiments; and FIGS. 11A-11C illustrate using previous user responses to a scanned document to provide suggestions to a subsequent user of the scanned document, according to one or more embodiments.

Figure 1:
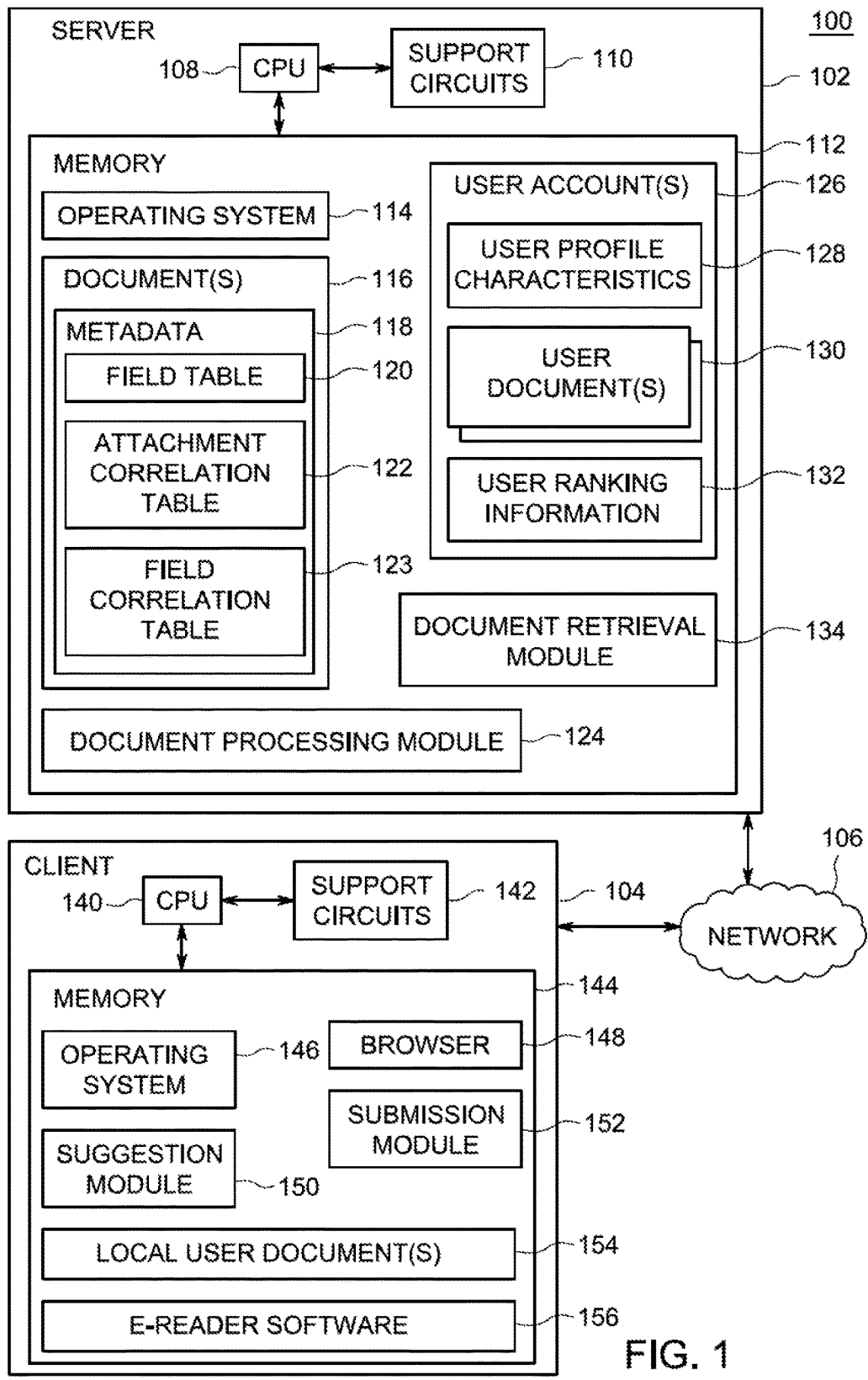
FIG. 1 is a block diagram of a system for detecting, validating, and correlating form-fields in a scanned document, according to one or more embodiments.

While the method and apparatus is described herein by way of example for several embodiments and illustrative drawings, those skilled in the art will recognize that the method and apparatus for detecting, validating, and correlating form-fields in a scanned document is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for detecting, validating, and correlating form-fields in a scanned document defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for identifying, validating, and correlating form-fields in a scanned document. The techniques enable a user to enter information in a scanned form as they would in an interactive form. An interactive form is a data-gathering form that provides suggestions and validations of entries interactively while a user fills out the form. In addition, interactive forms may provide additional questions based on a user's response to a previous question, thereby correlating related fields within the interactive forms. When a first user opens a scanned document including a form, the user fills out the form by creating text fields on the scanned document. A location on the document and a type of each field entry (e.g., date, email address, etc.) are stored on a server with the scanned document. A second user opens the scanned document that is a copy of the scanned document opened by the first user. The scanned document is accessed by the first user and the second user and is a scanned copy of the same physical document. For example, many users may access a scanned copy of a same school admission form. When the second user opens the scanned document, form-fields are pre-created at specific locations and suggestions are made to the second user based on the entries made by the first user. For example, a form-field may be automatically created at the location where the first user created it. In addition, the field type can be shown, for example, as a date, either via an icon or grayed out text. Alternatively, if the first user entered a date at a specific location in the scanned document, when the second user clicks on or near that specific location, the second user is prompted to enter a date. As more users enter information in the scanned document, more form-fields are created based on the user's entries and more meaningful suggestions are made to subsequent users. In addition, if data is available, then the form can be pre-populated. For example, if the name of the second user is known to an application displaying the form, then the name of the second user can be pre-populated in the form-field and displayed along with the form field.

In addition, based on previous user responses, correlations are made between fields. A correlation indicates that an answer in a first field likely leads to an answer in a second field. For example, a document may include a field titled, "Marital Status:". A user may check a box next to "Single" or "Married". The document also includes a field titled, "Spouse's Name". Previous users who checked the box next to "Married", typically filled in the field, "Spouse's Name". However, previous users who checked the box next to "Single", typically did not fill in the field "Spouse's Name". Hence, a correlation is created between the two fields indicating that they are related. A positive correlation exists between the "Married" field and the "Spouse's Name" field, meaning if the Married field has a check entered, the Spouse's Name field also has an entry. Conversely, a negative correlation exists between the "Single" and the "Spouse's Name" field, meaning if the "Single" field has a check entered, the "Spouse's Name" field is left blank. As such, if a user enters a check in the "Married" field, the "Spouse's Name" field is displayed more prominently in order to guide the user to enter information in the field. If the user enters a check in the "Single" field", the "Spouse's Name" field is displayed less prominently, or disabled in order to deter the user from entering information in the field.

Similarly, based on previous user responses, suggestions are made for files that may be candidates for attachment. For example, if a previous user attached a file with a filename of passport.pdf, when a subsequent user selects the field that requires an attachment, the subsequent user's documents are searched to locate files with names that are the same or similar to the file attached by the previous user. For example, if found, the subsequent user may be prompted to attach a file named mypassport.pdf, or the file can automatically be attached and a confirmation may be requested from the subsequent user.

Correlations may also be made between field entries and an attachment. When a file is attached to a scanned document, each word in the attachment is compared to each word entered in fields on the scanned document. If a field entry matches a word in the attachment, then a correlation is made between the form-field and the attachment. For example, if a previous user entered a passport number in a first form-field and, at a second form-field, attached a file that includes the passport number, a correlation is made between the form-field where the passport number was entered and the attachment, meaning the attachment should include the passport number. When a correlation exists and a subsequent user clicks on the form-field that requires the attachment, the user's documents are scanned. Any document that includes the entry made on the correlated field is suggested to the user as a possible candidate for attachment. When a file is attached, the attachment is evaluated to ensure the attachment includes the passport number entered in the correlated field. If the passport number is not found in the attachment, a warning message is displayed.

In accordance with an embodiment of the present invention, techniques are provided herein that allow for detecting, validating, and correlating form-fields in a scanned document. According to one embodiment, a method for detecting, validating and correlating form fields includes accessing a scanned document by an electronic device and determining form fields for the scanned document based on subsequent interactions with the scanned document by at least one other user. The determining comprises fetching location information corresponding to at least one location where the at least one other user entered information on the scanned document. The method further includes fetching data type information for data filled in the form fields by the at least one other user and either identifying or generating form fields using the fetched location information and fetched data type information. The method further comprises causing display of a plurality of interactive form-fields associated with the scanned document. According to some embodiments, the method also includes fetching correlation information, identifying form fields from the correlation information, and determining a rule, from the correlation information governing the identified form fields, for correlating two or more form-fields based on responses from one or more previous users. Input received for an identified form-field triggers display of a message or completion of an action based on the determined rule for the identified form field.

A first user may receive instructions to fill out a form. The user is provided a link to the form as a scanned document that is located, for example, in a document repository on a server. When the first user clicks on the link, the scanned document is displayed in the user's browser. The user may then fill out the form using tools available for adding information to scanned documents, for example "Add Text" or "Add Image" tools in ADOBE Reader. When the first user submits the form, document location information is stored for each interaction, for example, adding text, adding a check, adding a signature field, and the like. The document location information may include, for example, coordinates for a bounding box of each entered field. In addition, the associated user profile characteristic and data type of the data entered for each field is stored. The information is stored in a field table that includes the information for each field that was filled in by every previous user who filled out and submitted the scanned document.

In order to determine the associated user profile characteristic, the information entered in each field by the user is compared to existing user profile characteristics of the user that are stored in the user's account on the server. For example, if the information entered in a field matches the user's email address in the user's account, then the location information of that field is stored along with the user profile field name for email address. If the information of that field does not match any profile characteristics of the user, then just the location information and data type of the field is stored in the field table with the scanned document. For example, if the data entered is a date, but the date does not match any profile characteristic, for example, a date of birth, then just the location information and the data type, in the present example, a date, is stored. In addition, an order in which the user fills out the scanned document is also stored in the field table. For example, if a scanned document includes fields such as "First Name", "Last Name", "DOB", "email address", and the user fills out the fields in that order, the sequence number of the field is stored in the field table. The sequence may be used to guide a subsequent user from field to field should the subsequent user use, for example, tabs to navigate the scanned document.

Next, it is determined whether there is a correlation between one or more pairs of fields of the scanned document, such that if the user enters information in a first field, then it is likely that the user will also enter information in a second field. For example, a "Yes/No" question may include a check box for a "Yes" response and a check box for a "No" response. The "Yes/No" question is sometimes followed by a question that requests more information, such as, "If yes, . . . ." A check in the "Yes" field can be correlated (that is, have a positive correlation) to an entry in the "If yes, . . . " field. A check in the "No" field can be correlated (that is, have a negative correlation) to no entry in the "If yes, . . . " field. In order to determine the correlation, the occurrence of an entry in each field is compared to the occurrence of an entry in every other field for all users who filled out the scanned document. Probabilities are used to identify when the occurrence of a first field determines the co-existence of an entry in the second field. When the probability of co-existence exceeds a pre-defined threshold, for example, 95%, a positive correlation between the fields is stored in a field correlation table. The identified positive correlation is used to prompt a subsequent user to enter information in the second field if the user entered information in the first field. Conversely, a negative correlation is used to deter a subsequent user from entering information in the second field if user entered information in the first field, by for example, displaying the second field less prominently or disabling entry into the second field.

If a file is attached with the submitted scanned document, the location information for the field where the file was attached and the name of the attachment are stored in the field table. Further, the attachment is scanned to determine whether any words in the attachment match entries of the scanned document. If there are matches, a correlation is created between the field of each matching entry and the attachment and stored in an attachment correlation table. For example, if a passport is attached, the words in the passport are compared to entries in the scanned document. If, for example, data entered in a field of the scanned document matches a name in the passport, a correlation is created between that field and the attachment. When a subsequent user clicks on a location where an attachment is required, the user's documents, both locally and on the server are searched and scanned. Any documents that include information that matches the field entry are suggested to the user as candidates for appropriate attachments. In addition, when the subsequent user attaches a file, a validation is performed to ensure that the information that the subsequent user enters in the correlated field is present somewhere in the attachment.

When a current user opens the scanned document that has been filled out by one or more previous users, suggestions for filling out the scanned document are made to the current user, based on the responses of previous users who filled out the scanned document. Form-fields are identified based on the responses of previous users.

A location of the each field of the scanned document is determined based on the responses of previous users. The field table is accessed to identify the location information for each field entered by each user. Due to a user's ability to add text anywhere on the scanned document, the location information for a field created by two users may be close but not exactly the same. For example, a first user may enter text one half inch after the word "Name:". A second user may enter text one inch after the word "Name:". Although the fields are the same, their location information is not. Fields entered by previous users are determined to be the same field when the fields entered by different users substantially overlap and include the same type of data. In some embodiments, where multiple users enter data of different types at a same location, the data type entered by the majority of users is suggested. For example, at a given location, if 8 users entered an email address and 2 users entered a first name, when a current user enters information at that given location, the current user is prompted to enter an email address. In some embodiments, users are ranked based on the accuracy of their entries. When subsequent users enter data of a same type in a field as a previous user, the previous user's rank is increased. When multiple users enter data of different types at a same location, the data type of higher ranked users is suggested above the data type of lower ranking users.

For fields that are identified and created based on previous user responses, the current user's account is accessed in order to extract user profile characteristics so as to auto-populate the identified fields of the scanned document. For example, if a field is identified to be an email address, the current user's email address is extracted from the user's account and auto-populated at the location of the email address field. The same process is performed for all identified fields. If there is no information in the user profile characteristics for a particular field, the field is created, but left blank. The current user may then make entries in the scanned document. As each location within the scanned document is selected for making an entry, a suggestion for the type of field may be provided. For example, if the field is determined to be a date field based on previous user responses, a date widget may be displayed. Upon selection of a date, the date may be validated. For example, if the date, based on previous user responses is determined to be a date of birth, and the entered date is in the future, a warning message may be displayed. If a correlation exists between a current field and a second field, then upon entry of the current field, the second field is identified. For example, if a question on the scanned document reads "Marital Status:" with check boxes for "Single" and "Married", upon selection of "Single", a "Spouse's Name" field may be displayed less prominently or disabled. Conversely, if the check box for "Married" is selected, the "Spouse's Name" field may be displayed more prominently. Upon validation, if the "Spouse's Name" field is left blank, a warning message may be displayed.

When the current user clicks on a field that requires an attachment, suggestions are provided for possible files that could be an appropriate attachment. The filenames of the attachments of previous users are searched in both documents stored with the user's account in addition to documents stored locally on the user's computer. If any of the user's documents match the filename of an attachment attached by a previous user, the file is suggested as attachment. For example, if previous users attached files with filenames of "passport.pdf", "country.pdf", and "identification.pdf", the user's documents are searched for documents with similar filenames. When a correlation exists between one or more entered fields and an attachment, the user's documents are scanned and documents containing the field entries are suggested at files for attachment. For example, if there is a positive correlation between a passport number field and the attachment, the user's documents are searched. Any files that include the data entered in the passport number field are displayed to the user as suggestion for possible attachments. Upon validation, if the entry in the passport number field is not found in any attachment, a warning message is displayed. When the current user submits the scanned document, their data is stored in the field table, attachments are stored in the attachment correlation table, and field correlations are stored in the field correlation table.

Advantageously, with the embodiments described herein, form filling solutions such as FormsCentral and LIVECYCLE forms may provide users of a scanned document a user experience that mimics that of filling out an interactive form. Thus, even with a scanned document, users are guided through the scanned document by being provided with suggestions and validations, providing a richer user experience.

Various embodiments of a method and apparatus for detecting, validating, and correlating form-fields in a scanned document are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for detecting, validating, and correlating form-fields in a scanned document, according to one or more embodiments. The system 100 includes a server 102 and a client 104 communicatively couple to one another via a network 106. The server 102 is a computing device, for example a desktop computer, laptop, tablet computer, and the like. The server 102 may be a service for providing computing services in the cloud, such as Acrobat.com. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, documents 116, a document processing module 124, user accounts 126, and a document retrieval module 134. Each document 116 includes metadata 118. The metadata 118 includes a field table 120, an attachment correlation table 122, and a field correlation table 123. Each user account 126 includes a user profile characteristics 128, user documents 130, and user rating information 132. The operating system 114 may include various commercially known operating systems.

The client 104 is a computing device, for example a desktop computer, laptop, tablet computer, and the like. The client 104 includes a Central Processing Unit (CPU) 140, support circuits 142, and a memory 144. The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 144 includes at least one of Read Only Memory (ROM), Random Access Memory (RAM), disk drive storage, optical storage, removable storage and/or the like.

The memory 144 includes an operating system 146, a browser 148, a suggestion module 150, a submission module 152, local user documents 154, and e-reader software 156. The operating system 146 may include various commercially known operating systems. The e-reader software 156 includes any software capable of displaying digital content, such as ADOBE® Reader, ADOBE® ACROBAT®, and the like.

The network 106 includes a communication system that connects computers (or devices) by wire, cable, fiber optic and/or wireless link facilitated by various types of well-known network elements, such as hubs, switches, routers, and the like. The network 106 may be a part of the Intranet, virtual private network, or Internet using various communications infrastructure, such as Ethernet, Wi-Fi, a personal area network (PAN), a wireless PAN, Bluetooth, Near field communication, and the like.

A first user receives, using any form distribution workflow, a document 116 that must be filled out. For example, a new employee of a company may be required to fill out the document 116 in order to supply the company information required by the Benefits or Payroll department. The new employee, hereafter referred to as a user, may be emailed a link to the document 116 on the server 102. The first user accesses the document 116 via the browser 148. The document 116 is opened using document display software, for example, using the e-reader software 156. The term "first user" means that at the current time no other user has filled out the document 116. In other words, this is the first time any user has filled out the document 116. The document 116 is a scanned, non-interactive document.

The first user fills out the document 116 by creating text fields for the entry of information at various locations in the document, for example, by using an "Add Text" tool of the e-reader software 156. The document 116 may, for example, include fields, such as "First Name", "Last Name", "Address", "Marital Status", and "Spouse's Name". There may also be a field where a file should be attached that verifies the first user's address. The first user selects field locations in the document 116 and enters information related to that field. At some field locations the first user may also attach, for example, a utility bill that includes the first user's name and address. As each entry is made, the sequence of the entries is recorded, as well as location information for each field entry. Location information includes a page number of the scanned document 116 as well as a bounding box for each entry made by the first user, where the bounding box identifies the location in the document in which the entry is made. The first user submits the form for example, by selecting a "Submit" or "Save" button. The submission module 152 packages the location information, the data entered and the sequence number for each field, in addition to any attachments, and sends the package to the server 102.

The document processing module 124 evaluates the entries received from the submission module 152. The data processing module 124 matches each field's entered data against various rules, filters and regular expressions to determine a possible data type for the field. In addition, for each entry, the document processing module 124 determines whether the entered information matches any information in the first user's user profile characteristics 128. For example, if an entry reads, "John" and the user profile characteristics 128 includes a field titled "firstName:" John, then the document processing module 124 stores for that entry the location information as well as the user profile field name, and the type of data in the field table 120. An entry in the field table 120 includes at least a document identifier for the document 116, a page number where the entry was added, a user identifier to identify the user who added the entry, coordinates for the bounding box of the entry, a user profile field name, if found, and a field data type. In the present example, the entry in the field table 120 for the entry "John" may be as follow: <doc1>, page1, <user5>, {top:3,left:13, right:90,bottom:70}, firstName, text. If a file was attached to the document, the entry in the field table 120 for that attachment may be as follows: <doc1>, page2, <user5>, {top:12,left:12,right:123,bottom:134}, "utilitybill.pdf", attachment.

The document processing module 124 then extracts stored information in the field table 120 to determine whether any correlations exist between one or more fields of the document and the attachment. The document processing module 124 compares entered information for each entry to each word in the attachment. If a match is found, a correlation is created and stored in the attachment correlation table 122. For example, if a first entry reads, "John", a second entry reads "Smith", and a third entry reads "123 Elm Street, Middletown N.Y.", and the attachment, for example, "utilitybill.pdf" includes the "John Smith 123 Elm Street, Middletown N.Y.", a positive correlation is made between the field entry at the location where "John" was entered and the "utilitybill.pdf" attachment. A positive correlation is also made between the field entry at the location were "Smith" was entered and the "utilitybill.pdf" attachment, and a positive correlation is made between the field entry where the address was entered and the "utilitybill.pdf" attachment. The document processing module 124 stores the correlations in the attachment correlation table 122. The attachment correlation table 122 includes entries for each field that should be found in an attachment. In some embodiments, a document identifier, page number and bounding box for an entry are defined, along with the document identifier, page number, and bounding box for a field that includes an attachment that should include the data in the entry. For example, the correlation for the entry for field1 to appear in the file attached to field 2 may be as follows:
<doc1>,2,{top:12,left:13,right:08,bottom:13}|<doc1>,5, {top:34,left:23,right:89,bottom: 32}

The correlation can identify that the entry in the specified bounding box on page 2 of doc1 should be included in the file attached to the field at the specified bounding box on page 5 of doc1. In some embodiments, an entry is referred to using a global identifier (i.e., guid). In such embodiment, the correlation for the entry for field 1 with respect to field 2 may appear as follows:
<field1_guid>|<field2_guid>

One or more field entries may be correlated to one or more attachments. The correlations are stored in the attachment correlation table 122.

The document processing module 124 then determines whether there are any correlations between fields within the document 116. The correlations between fields within the document 116 become more evident as more users fill out the document 116. A positive correlation between two fields of the document 116 identifies when an entry in a first field will likely result in an entry in a second field or conversely, a negative correlation between two fields of the document 116 identifies when an entry in the first field will likely result in no entry in the second field. For example, the document 116 may include a first question "Do you have a valid driver's license?" The first question may be followed by check boxes for "Yes" and "No". The document 116 may also include the second question, "If yes, please enter your driver's license number." The positive correlation exists when the first question is answered "Yes" and the second question typically has data entered. The negative correlation exists when the first question is answered "No" and the second question is typically left blank.

The correlation is identified by calculating a probability of two field entries co-existing, based on previous user responses. The document processing module calculates the probability across all users who have filled out the document 116. The existence of an entry in one field is calculated against the existence of an entry in every other field. Where the probability between the existence of a first field and the existence of a second field exceeds a predefined threshold, for example, 95%, a positive correlation is identified. In other words, if most times the first field is filled in, the second field is also filled in, there is a positive correlation. For example, if 97% of user who entered information in field1 also entered information in field3, meaning there is a 97% probability that field3 co-exists with field1, then a positive correlation exists. Field correlations are stored in a field correlation table 123 for the document 116. In some embodiments, the field correlation table 123 is a table that includes a row for each field with columns that represent the probability of its co-existence with every other field in the document. In some embodiments, the field correlation table 123 is a data structure, such as a hash_map or tree to represent the same data at run time for faster retrieval.

When a subsequent user requests the document 116, the document retrieval module 134 accesses the document 116 and its associated metadata 118, specifically, the field table 120, the attachment correlation table 122, and the field correlation table 123. The document retrieval module 134 extracts field information for the document 116 from the field table 120. Due to the ability for a user to enter text anywhere in the document 116, multiple users may have entered information in a same general location, but not in exactly the same location. For example, user1 may have entered his name one-half inch after the word "Name:" in the document 116. User2 may have entered her name one inch after the word "Name:" in the document 116. Providing multiple suggestions to a user for the same field would be overwhelming and confusing. As such, a single field is identified from the multiple user entries. In order to determine that the multiple entries identify a single field, the bounding boxes in the field table 120 are extracted. Bounding boxes for entries entered by different users, where the bounding boxes overlap by at least a predefined percentage, for example 60%, and include the same type of data, are determined to be the same field. One bounding box is selected to represent each field on the document 116. The document retrieval module 134 creates a form-field for each field of the document 116 that can be determined based on previous user responses.

The document retrieval module 134 then accesses the user profile characteristics 128 in order to extract data that may be used to auto-fill the created form-fields. For example, if a form-field is created for an email address, the email address of the user is extracted from the user profile characteristics 128 and provided with the form. In addition, any correlations for fields defined in the attachment correlation table 122 are also provided with the document 116.

The e-reader software 156, for example ADOBE Acrobat.com, displays the document 116 in the browser 148, where the user may then select locations in the document 116 and enter information. At each location, if one or more previous users entered information in the same general area of the document 116, the form-field was pre-created and the user may enter information in the pre-created form-field. Suggestions may be provided to guide the user in filling out the document 116. The suggestions are made based on the type of data entered by the one or more previous users who filled out the document 116. For example, if the previous users entered a date in the form-field, the suggestion module 150 provides a date widget from which the user may select a date. In addition, when a user leaves a form-field by selecting, for example a tab key to move to a next form-field, the suggestion module 150 identifies the sequence number of the form-field as well as the next form-field in the sequence. The suggestion module 150 then moves the cursor to the next form-field in the sequence. If the user enters information in a first form-field that is correlated to a second form-field, the suggestion module 150 displays the second form-field in more or less prominence depending on the correlation (e.g. positive or negative). For example, if an entry in the first form-field positively correlates to an entry in the second form-field, then the suggestion module 150 displays the second form-field more prominently to guide the user to entered information in the second from field. However if the first form-field correlates negatively to an entry in the second form-field, then the suggestion module 150 displays the second form-field less prominently (or not at all) or, in some embodiments, the suggestion module 150 disables the second form-field from accepting entered information.

When a user selects a field that requires an attachment, the suggestion module 150 searches the local user documents 154 as well as user documents 130 on the server 102. The suggestion module 150 displays a list of possible documents that are candidates for attachment. Any documents 154 that have a same or similar filename to documents attached by previous users are suggested to the user. If the attachment correlates to a created form-field in the document 116, the suggestion module 150 searches the local user documents 154 and the user documents 130 on the server 102 and suggests those documents that include the information entered in the correlated form-field. For example, if a passport number field correlates to an attachment, it means that the entry in the passport number field should also be in located somewhere in the attachment. As such, the suggestion module 150 scans and indexes each word in all local user documents 154 and all user documents 130 for the passport number entered in the passport field, and suggest those files that include the passport number to the user. If two or more form-fields are correlated to an attachment, the suggestion module 150 may select a plurality of documents that, in combination, provide the entries from the two or more form-fields.

In some embodiments, when the user has completed filling out the document 116, the user submits the document 116, using for example a "Submit" or "Save" button. In some embodiments, the save mechanism may be implicit (e.g., auto-save functionality in the background). In response, the submission module 152 performs validations, packages the user responses, and sends the information to the server 102. If one or more form-fields correlates to an attachment, the submission module 152 searches the one or more attachments to ensure the entry in the form-field is found in the one or more attachments. This validation may be performed when a file is selected for attachment. However, the validation may be repeated when the document 116 is submitted to ensure the user has entered a correct one or more attachments. If the entry is found in the attachment(s), the attachment is validated for inclusion in the package prepared by the submission module 152. If the entry is not found in the attachment(s) or if no file is attached, the submission module 152 displays a warning message. The document processing module 124 processes the received package and stores the information in the field table 120, attachment correlation table 122, and field correlation table 123. As such, after the first user fills out the document 116, all subsequent users are provided guidance for filling out the document 116 based on the previous users' entries.

Figure 2:
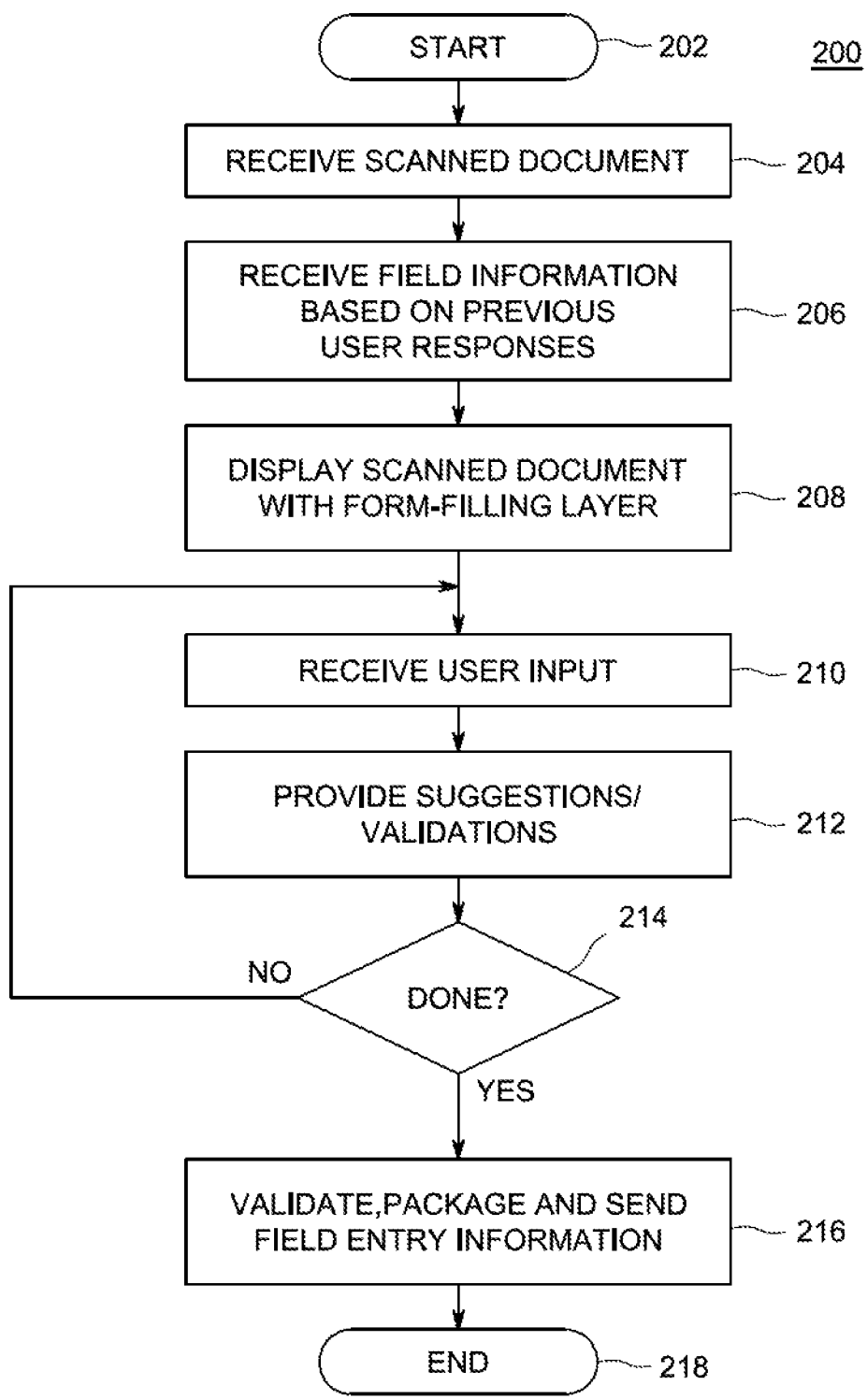
FIG. 2 depicts a flow diagram of a method for providing guidance to a user who is filling out a scanned document, as performed by the suggestion module of FIG. 1, according to one or more embodiments.

FIG. 2 depicts a flow diagram of a method 200 for providing guidance to a user who is filling out a scanned document, as performed by the suggestion module 150 of FIG. 1, according to one or more embodiments. The method 200 receives a scanned document in addition to information regarding previous user responses to the document. Based on the previous user responses, the method 200 guides the current user in filling out the document. The method 200 starts at step 202 and proceeds to step 204.

At step 204, the method 200 receives a scanned document. The scanned document is received in response to a user request. For example, the user may receive an email that includes a link to the scanned document with instructions to fill out the scanned document. The link identifies a location of the document on a server, for example, a document repository that includes user account information for the users who access the document repository. The user is logged into the server from which the scanned document is retrieved.

The method 200 proceeds to step 206, where the method 200 receives field information from the server based on previous users' responses to the scanned document. Field information includes specific locations of where previous users entered information on the scanned document and the types of data entered at those specific locations. The information may also include correlations between one or more fields and one or more attachments or between two or more fields within the scanned document. Field information may also include a sequence in which previous users entered information in the scanned document. If the information entered by previous users is associated with a characteristic in a user profile of the user's account, the information from the user's profile is also included with the field information.

The method 200 proceeds to step 208, where the method 200 displays the scanned document. The method 200 displays the scanned document using any type of e-reader application, for example Acrobat.com. The method 200 also displays, in a layer that overlays the scanned document, any fields identified in the field information. Any received user profile characteristics are also displayed in the fields. For example, the scanned document may include fields titled, "Name", "Address", "Do you have a Driver's License" with check boxes for "Yes" or "No", a field titled "If yes, please provide driver's license number", and a field "Attach Driver's License Here". The previous user responses identify a location where previous users entered information when they filled out the scanned document. The location is defined as a bounding box on the form. The method 200 generates bounding boxes in the layer for each field identified from previous user responses. The method 200 also displays any user profile information received with the identified fields.

For example, if the user's name is stored in the user's profile, the name is provided with the information and the method 200 displays the user's name in the field located where previous users entered name information. The layer is transparent, such that when a user selects a location on the layer overlying the scanned document and enters information, it appears as if the information is being entered directly onto the scanned document. The method 200 proceeds to step 210.

At step 210, the method 200 receives user input. The user may select a text entry tool, for example "Add Text" from the e-reader software, and select a location where to enter text. The method 200 records the sequence in which a user enters information into the scanned document. The method 200 proceeds to step 212.

At step 212, the method 200 determines if the selected location can provide the user with a suggested entry. For example, if the selected location is within an identified bounding box of a field, the method 200 identifies the data type associated with the field and provides data entry suggestions to the user based on the entries to that field made by previous users. For example, if based on the entries to that field by previous users it was determined that the correct data type for that field is a date, a date widget is displayed. The suggestions guide the user to provide correct information based on the information submitted by previous users. If the user enters information that is different from the identified data type, the method 200 displays a warning message.

If the selected location is identified, based on previous user responses, as a field requiring an attachment, the method 200 accesses the filenames of attachments attached at the selected location. The method 200 then searches the user's local documents in addition to sending a request to the server to search the user's documents stored on the server in order to retrieve a list of all documents with a same or similar name to the files attached by previous users. For example, if the previous users attached files with filenames of "mylicense.pdf", and "license.pdf", "driverslicense.pdf" and the search found a document titled "mydriverslicense.pdf", the method 200 displays "mydriverslicense.pdf" as a suggestion for a possible attachment. The user may select the suggested attachment or select another file for attachment. In the case where a correlation is identified in the received field information that correlates a field to the attachment, the method 200 performs a more detailed search. When a correlation exists, the method 200 performs a search of the user's local documents and request the server perform a search of the user's documents on the server for files that include the information entered in the correlated field. For example, a correlation may exist between the entry made in the field titled, "If yes, please provide your driver's license number" and the attachment field titled, "Attach Driver's License Here." The method 200 retrieves a list of any user files, local or on the server, that include the entered driver's license number. The method 200 provides the list as suggestions for possible attachment. When the file is attached, the method 200 verifies that the attached file includes the information in the correlated field. If the attached file does not include the information, the method 200 displays a warning message. If there is an attachment to more than one field entry, then multiple files may be attached. The method 200 displays a warning message if any one or more field entries are not located in the one or more attachments.

If the selected location identifies a field that is correlated to another field based on previous user responses, the method 200 provides suggestions based on the correlation. For example, based on previous user responses, a correlation is identified such that when previous users answered "Do you have a Driver's License" with a check box for a "Yes" answer, the previous users also entered information in the field titled "If yes, please provide driver's license number", and also attached a file in the field "Attach Driver's License Here". However, when previous users answered "Do you have a Driver's License" with a check box for a "No" answer, the previous user left the field titled "If yes, please provide driver's license number" blank, and also did not attach a file in the field "Attach Driver's License Here". As such when a user checks the box at a location for a "Yes" answer, the method 200 displays the bounding boxes for the fields "If yes, please provide driver's license number" and "Attach Driver's License Here" more prominently. Similarly, when a user checks the box at a location for a "No" answer, the method 200 displays the bounding boxes for the fields "If yes, please provide driver's license number" and "Attach Driver's License Here" less prominently. If the user enters information in the less prominently displayed fields, the method 200 displays a warning message.

The method 200 proceeds to step 214, where the method 200 determines whether the user is done entering information into the scanned document. In some embodiments, the method 200 determines the user is done when the user indicates he has completed all entries by, for example, selecting a "Submit" or "Save Entries" button. In some embodiments, where entries are auto-saved in the background, the method 200 determines that a user is done when there are no known fields left to be filled out based on the fields that were filled by previous users. In other words, when all fields that were created based on previous user entries have data entered, the method 200 determines that the user is done. In such embodiment, the data is continuously saved and validation is performed when all fields are filled in. If the method 200 determines the user is not done, the method 200 proceeds to step 210 and iterates until the user indicates that he has completed filling out the scanned document at which time the method 200 proceeds to step 216.

At step 216, the method 200 validates, packages and sends the user's entries to the server. The method 200 validates the entries to provide the user a chance to correct any entries. The method 200 verifies that correlated attachments include the correct information and displays warning messages accordingly. In addition, the method 200 verifies that entries are made in positively correlated fields if no entries were made and displays a warning message. The method 200 then packages the location information for each field, including a page number for the document and bounding box information and sends it along with the user's entries to the server from where the scanned document was sent.

The method 200 proceeds to step 218 and ends.

Figure 3:
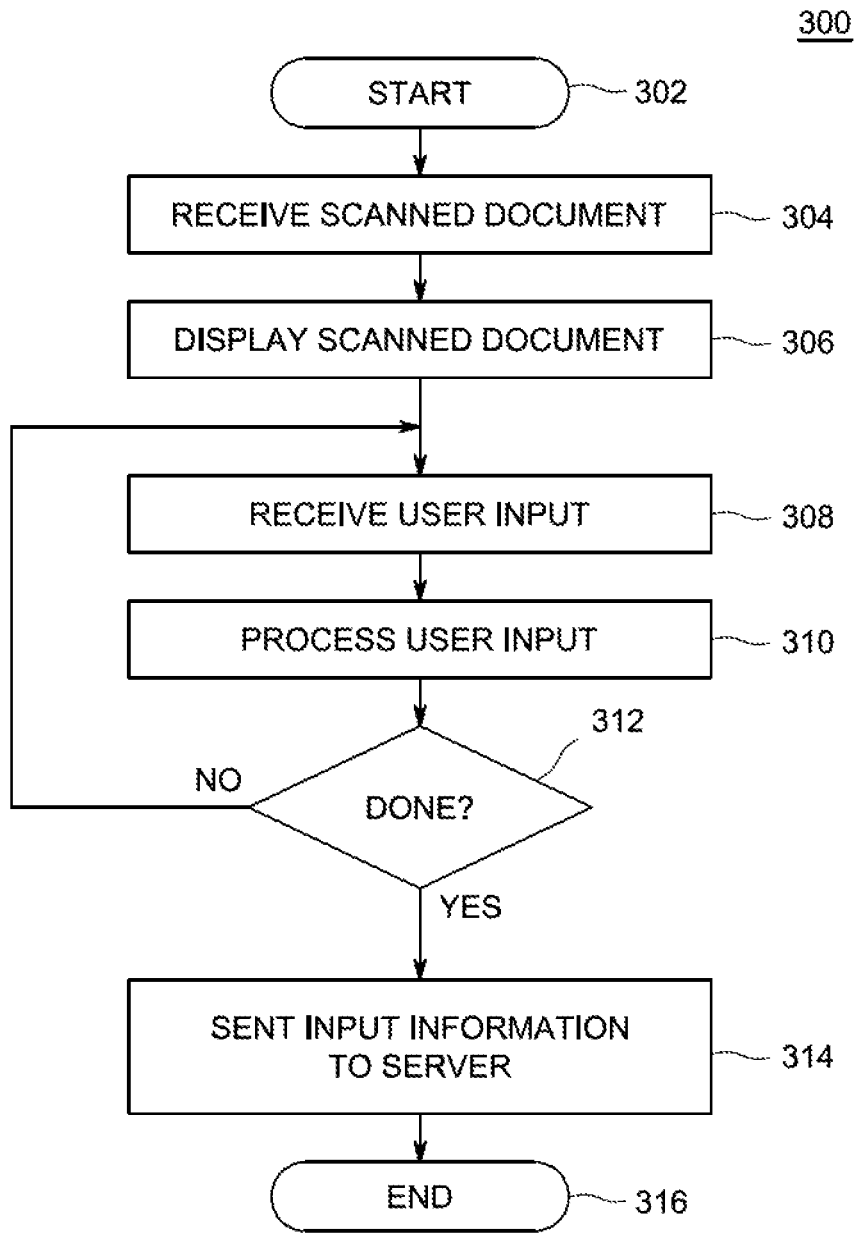
FIG. 3 depicts a flow diagram of a method for processing information entered into a scanned document, as performed by the document processing module of FIG. 1, according to one or more embodiments.

FIG. 3 depicts a flow diagram of a method 300 for processing information entered into a scanned document, as performed by the document processing module 124 of FIG. 1, according to one or more embodiments. The method 300 processes information when the scanned document is accessed for a first time and there are no previous user responses from which to create form fields. The method 300 starts at step 302 and proceeds to step 304.

At step 304, the method 300 receives a scanned document. The scanned document is received in response to a user request. For example, the user may receive an email that includes a link to the scanned document with instructions to fill out the scanned document. The link identifies a location of the document on a server, for example, a document repository that includes user account information for the users who access the document repository. The user is logged into the server from which the scanned document is retrieved.

The method 300 proceeds to step 306, where the method 300 displays the scanned document. The method 300 displays the scanned document using any type of e-reader application, for example Acrobat.com. Due to the fact that no previous user has entered information for the scanned document, the method 300 displays the scanned document with no suggested form fields. The method 300 also provides a layer that overlays the scanned document. Any inputs provided by a user are entered on the layer to give the appearance that the inputs are being entered into the actual scanned document.

The method 300 proceeds to step 308, where the method 300 receives user input. The user may select a text entry tool, for example "Add Text" from the e-reader software, and select a location where to enter text. The user then enters text in the text box. The user may also select a tool to attach a document. When the user clicks on a different part of the scanned form (i.e., indicates the user has finished entering input), the method 300 proceeds to step 310.

At step 310, the method 300 processes the user input. The method 300 records information regarding a user's input in the scanned document. The information includes at least a page number of the document, and a bounding box that identifies a location in the scanned document where the input was entered. The information also includes a user identifier. The user identifier is used to later access the user's account in order to identify whether any text inputs match the user's characteristics in the user's account. Lastly, the method 300 records the sequence in which a user enters information into the scanned document. For example, if the user enters input in the sequence name, then address, then phone number, subsequent users are guided to use the same sequence when navigating (e.g., tabbing) through the scanned document.

The method 300 proceeds to step 312, where the method 300 determines whether the user is done filling out the form. In some embodiments, the user indicates that they are done but clicking a button, for example, a "SAVE" or "SUBMIT" button. In some embodiments, the user indicates that they are done by closing the document. If the method 300 determines that the user is not done, the method 300 proceeds to step 308 and iterates until the method 300 determines that the user is done. However, if at step 312, the method 300 determines that the user is done, the method 300 proceeds to step 314.

At step 314, the method 300 sends the recorded information to the server where the document was received. The recorded information is stored and used for guiding subsequent users as described in FIG. 2 above. The method 300 proceeds to step 316 and ends.

Figure 4:
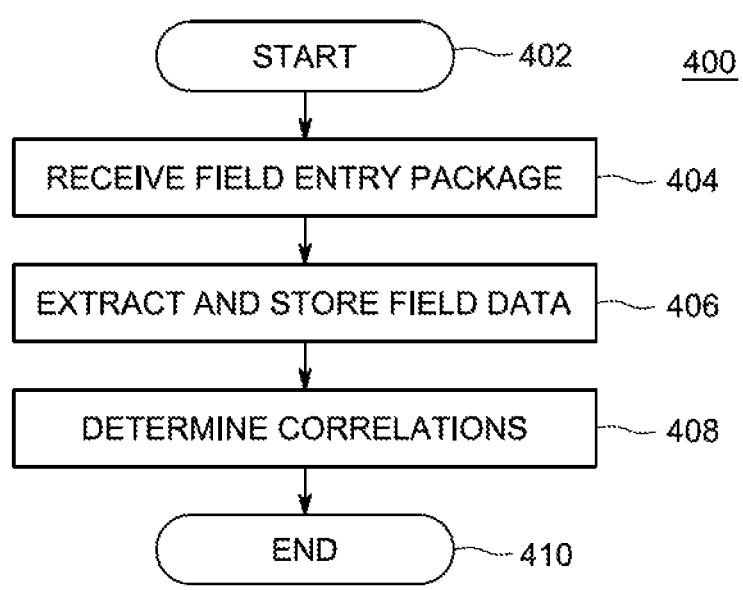
FIG. 4 depicts a flow diagram of a method for identifying field information as performed by the document processing module of FIG. 1, according to one or more embodiments.

FIG. 4 depicts a flow diagram of a method 400 for identifying field information as performed by the document processing module 124 of FIG. 1, according to one or more embodiments. The method 400 processes information regarding entries submitted by a user who filled out a scanned document. The method 400 starts at step 402 and proceeds to step 404.

At step 404, the method 400 receives a package that includes information regarding a user's field entries in a scanned document. The information includes at least a page number and bounding box that identifies a location in the scanned document where each entry was made. The information also includes a user identifier. The user identifier is used to access the user's account.

The method 400 proceeds to step 406, where the method 400 extracts information from the received package and stores the information as various types of field data. The method 400 analyzes the field data to compare each entry made by the user to user profile characteristics in the user's account. If a match is found, the user profile field name is stored with the location information in, for example, a field table. Exemplary entries in the field table are stored as shown in FIG. 5.

FIG. 5 illustrates an exemplary field table 500, according to one or more embodiments. The table 500 includes, for each field entered by a previous user, a record identifier 502, a document identifier 504, a page number 506, a form-field identifier 508, a user identifier 510, dimensions 512, a field type 514, a profile field name 516, and a sequence order 518. The record identifier 502 is merely an entry number in the field table 500. The document identifier 504 identifies the scanned document in which the entry was made. In the present example, all entries are made to the scanned document with a document identifier of 700. The page number 506 identifies the page number in the document where the entry was made. The form-field identifier 508 is an identifier of a form-field where data was entered by the user. The user identifier 510 identifies the user who entered information in the form field. The dimensions 512 identify a location on the page of the scanned document where the form-field is located. The type 514 is the field type of the form-field that was entered by the user. The profile field name 516 identifies the field name of the user profile characteristic in the user's account that matches the information entered by the user. In the present example, the form field with form-field identifier 702.1 had information entered that matched the information in the user's profile characteristics in the field firstName. In some embodiments, the type 514 is an attachment, an attachment name, mimetype, and tags may be stored. For example, if previous users have attached a photo, possible attachment mimetypes that may be stored include, but are not limited to image/png, image/jpg, image/tiff, application/pdf. In addition, tags may be stored, such as "passport". In such embodiment, where a user uploads a passport, the information may be stored as:

<myPassport.png>|<image/png>|<passport>

In the case where the information entered by the user does not match a user profile characteristic, the profile field name 516 is left blank. The sequence order 518 identifies the form-field identifier 508 of the field where information was entered by the user after the user completed entering information in the current field. The sequence order 518 is used to guide the user when filing out the scanned document. When the user navigates the form fields of the document using, for example, 'tab' on a keyboard, or 'next' on a virtual keyboard on a touch device, the user is next directed to the form-field identified in the sequence order 518.

The method 400 proceeds to step 408, where the method 400 determines attachment correlations between fields of the scanned document and an attachment to the document as well as correlations between two or more fields of the scanned document as described in further detail with respect to FIG. 6 below. The method 400 proceeds to step 410 and ends.

Figure 6:
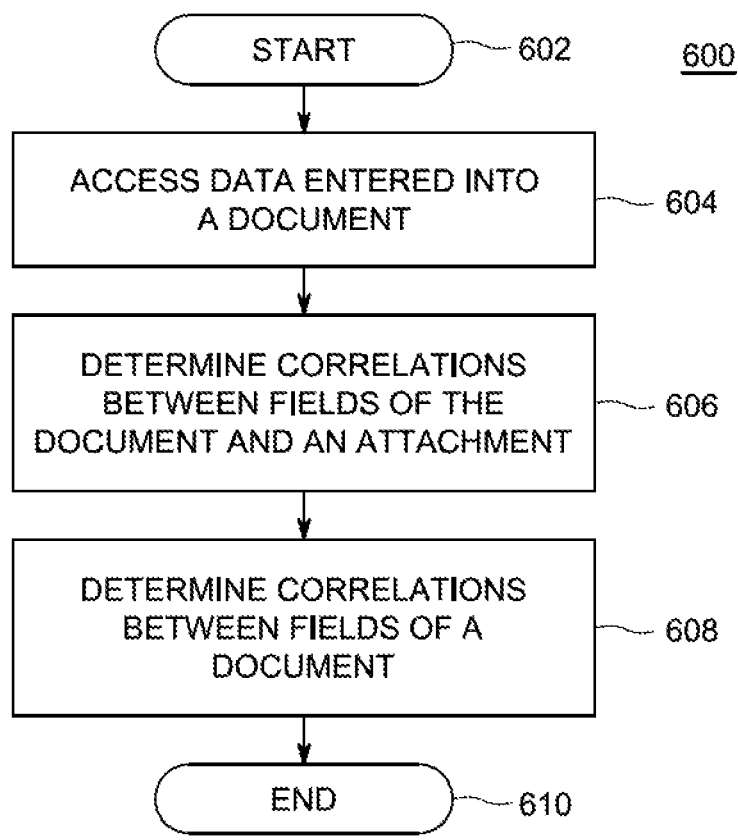
FIG. 6 depicts a flow diagram of a method for determining correlations, as performed by the document processing module of FIG. 1, according to one or more embodiments.

FIG. 6 depicts a flow diagram of a method 600 for determining correlations, as performed by the document processing module 124 of FIG. 1, according to one or more embodiments. The method 600 starts at step 602 and proceeds to step 604.

At step 604, the method 600 accesses field data entered into fields of a document. The document may be any document with data entered, for example, a scanned document, an interactive document, and the like. The method 600 analyzes the field data. The method 600 compares entered information for each field entry to each word in the attachment. If there is a match, the method 600 stores the correlations in, for example, an attachment correlation table. The attachment correlation table includes entries for each field that should be found in an attachment. In some embodiments, a document identifier, page number and bounding box for an entry are defined, along with the document identifier, page number, and bounding box for a field that includes an attachment that should include the data in the entry. For example, the correlation for the entry for field1 to appear in the file attached to field 2 may be as follows:
<doc1>,2,{top:12,left:13,right:08,bottom:13}|<doc1>,5,{top:34,left:23,right:89,bottom: 32}

The correlation can identify that the entry in the specified bounding box on page 2 of doc1 should be included in the file attached to the field at the specified bounding box on page 5 of doc1. In some embodiments, an entry is referred to using a global identifier (i.e., guid). In such embodiment, the correlation for the entry for field 1 with respect to field 2 may appear as follows:
<field1_guid>|<field2_guid>

One or more field entries may be correlated to one or more attachments. The correlations are stored in the attachment correlation table.

For example, if a first entry reads, "John", a second entry reads "Smith", and a third entry reads "123 Elm Street, Middletown N.Y.", and the attachment, for example, "utilitybill.pdf" includes the "John Smith 123 Elm Street, Middletown N.Y.", a positive correlation is made between the field entry at the location where "John" was entered and the "utilitybill.pdf" attachment. A positive correlation is also made between the field entry at the location were "Smith" was entered and the "utilitybill.pdf" attachment, and a positive correlation is made between the field entry where the address was entered and the "utilitybill.pdf" attachment. The method 600 stores the correlations in the attachment correlation table.

The method 600 proceeds to step 606. At step 606, the method 300 determines whether there are any correlations between fields in the scanned document. A positive correlation between two fields of a document indicates that an entry in a first field of the scanned document should result in an entry in a second field of the scanned document. For example, assume that the scanned document includes the question "Do you have a valid driver's license?", a check box for "Yes", a check box for "No" and a field titled "If yes, please provide driver's license number." When a previous user entered a check in the check box for "Yes", the previous user also entered a driver's license number. However, when a previous user entered a check in the check box for "No", the previous user left the driver's license number field blank. In order to determine a correlation based on previous user responses, the method 600 analyzes the existence of each response on the scanned document with respect to every other response on the scanned document. For example, assume there are six fields, fields 1-6, on the scanned document and the scanned document has been filled out by three users, userA, userB, and userC as illustrated in FIG. 7.

FIG. 7 depicts an example of a table 700 that identifies what information was entered by users in which fields of a document, according to one or more embodiments.

A nil entry indicates that the user did not make an entry in the indicated field. In the present example, UserA created 3 fields, namely A1, A2, and A3. UserB created 4 fields, namely B1, B2, B3, and B4. UserC created 3 fields, namely C1, C2, and C3. Assume it is determined that A1, B1, and C1 are occurrences of the same field. Similarly, A2 is the same field as C2, and A3 is the same field as C3. A same field is determined when the fields are entered by different users, the bounding box of the field entries overlap by some pre-defined percentage, and the data entered in the fields is of a same type.

By analyzing the responses, the method 600 determines the number of times each field exists with respect to every other field in a response. The method 600 calculates $N_{xy}/N_x$, where $N_{xy}$ is a number of times field x coexists with field y in the previous user responses and $N_x$ is a number of times field x exists in all filled responses of previous users as illustrated in FIG. 8.

FIG. 8 depicts an example of a table 800 that identifies a number of times each field co-exists with respect to every other field in a response, according to one or more embodiments.

The information in table 800 indicates that field 1 has a 2/3 probability of co-existence with field 2 and field 3 and a 1/3 probability of co-existence with field 4, field 5, and field 6. Similarly, field 2 has a 2/2 probability of co-existence with field 1 and field 3. Field 4 has a 1/1 probability of co-existence with field 1, field 5, and field 6. The probability of the co-existence of a field with itself is marked as N/A (not applicable). Co-existence is stronger as the probability approaches 1 and is weaker as the probability approaches 0. A correlation is determined when the probability of co-existence exceeds a predefined threshold, for example, 95%. These correlations (i.e. probabilities of co-existence) are stored in a field correlation table and can be used to guide a subsequent user who fills out the form. For example, when the subsequent user enters text in field 2, field 1 and field 2 are displayed more prominently and field 4, field 5, and field 6 are displayed less prominently.

The method 600 proceeds to step 610 and ends.

Figure 9:
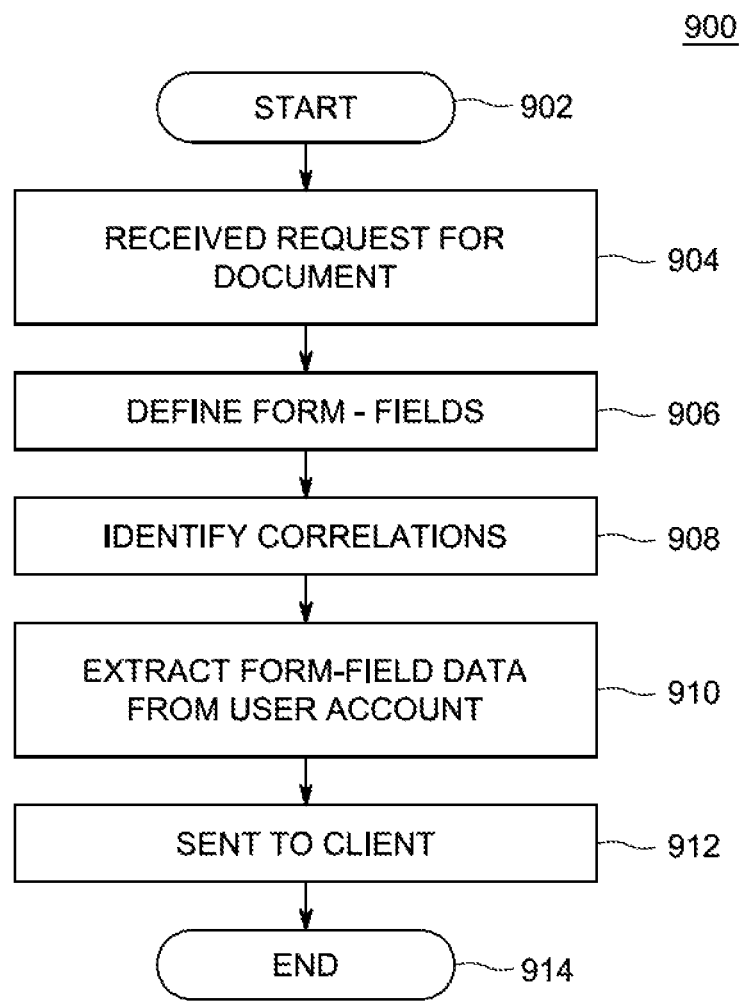
FIG. 9 depicts a flow diagram of a method for retrieving a scanned document and providing information regarding previous user response in order to make the scanned document appear interactive, as performed by the document retrieval module of FIG. 1, according to one or more embodiments.

FIG. 9 depicts a flow diagram of a method 900 for retrieving a scanned document and providing information regarding previous user response in order to make the scanned document appear interactive, as performed by the document retrieval module 134 of FIG. 1, according to one or more embodiments. The method 900 starts at step 902 and proceeds to step 904.

At step 904, the method 900 receives a request for a scanned document. The scanned document is stored in a repository and includes metadata in the form of a field table, an attachment correlation table, and a field correlation table. The tables identify information regarding how previous users filled out the scanned document. The request includes a user identifier which may be used to access the user's account in order to extract user profile characteristics.

The method 900 proceeds to step 906, where the method 900 determines form-fields based on previous user responses. The form-fields may be used to provide suggestions to the user with regard to where to enter information on the scanned document and what type of information may be entered. The method 900 evaluates the field data for a document that have been entered by previous users. Any fields that were entered by different users, that have bounding boxes that overlap by some pre-defined percentage, and have a same type of data entered are determined to be a same field in the scanned document. For example, two previous users, namely Mary and John may have entered their respective names in a similar, but not exactly same location.

Referring back to the field table 500 of FIG. 5, the record number 1 and record number 2 are associated with the entries of John and Mary. John entered text that matched the information in his user profile characteristics in the firstName field. John entered the information in a bounding box at location [12,34,60,100]. Similarly, Mary entered text that matched the information in her user profile characteristics in the firstName field. Mary entered the information in a bounding box at location [16,36,64,102]. To display both of these locations would be confusing to a user. As such, because the information was made by different users, the fields overlap by a pre-defined percentage, for example, 60%, and the include the same type of data, the method 900 determines the fields to be the same field and defines only one form-field as a suggestion to the user. In some instances, due to a user's ability to enter any type information into a form-field, different users may enter different types of information in a same form-field. In order to address the disparate information types, the method 900 evaluates the users who entered the information and selects a more likely field type. For example, a form-field may have an email address entered by three previous users and a first name entered by two previous users. In some embodiments, the type entered by a majority of users is selected as the field type.

In some embodiments, a user rank is maintained for each user. The user rank is incremented each time a subsequent user enters information in the form-field of a same field type as the user. As a result, a user who enters information consistent with subsequent users, and more likely correct information, has a higher rank than a user who enters information inconsistent with the entries of subsequent users. When different users enter different types of information in a form-field, the method 900 determines field type based on a weighted average. In the present example, three users entered an email address, which is hereafter referred to as data_typeA. Two users entered a firstName, which is hereafter referred to as data_typeB. The method 900 calculates the score for each data type. The method 900 calculates the weighted average for each data type as follows:

$$\text{data type score} = \sum_{1}^{n} \frac{(\text{rank constant} * \text{rank of user}_n)}{n}$$

where the rank constant is a predefined value 0<rank constant<=1, rank of user$_n$ is the rank maintained for the user normalized in log or linear scale from 1 to 100, and n is the total number of users who entered the data type.

In some embodiments, the rank of a user is normalized in order to compensate for any outliers. For example, if a user has a high rank, although his entry is incorrect, it would become the de-facto choice of the system even if a majority of users make a correct entry. As such, outliers can lead to erroneous suggestions to a user and normalization reduces their impact. In some embodiments, the rank of the user is not normalized, in which case actual rank of the user is used to calculate the data type score. The method 900 calculates the data type score for each data type entered by previous users. The method 900 selects the data type with the highest score as the data type for the form-field.

In some embodiments, the method 900 determines the field type by multiplying a number of users who entered a field type by the user rank. For example, suppose two users of rank 3 enter an email address and two users of rank 2 enter a first name in a particular form field. Assuming a rank-constant of 1, a score of $[(1*3)+(1*3)]/2=3$ is assigned to the field type email address and a score of $[(1*2)+(1*2)]/2=2$ is assigned to the field type first name. The method 900 selects the field type email address as it has the higher score. The method 900 repeats this process for each field in the scanned document that received a response from previous users.

The method 900 proceeds to step 908 where the method 900 identifies correlations from the attachment correlation table and the field correlation table that were stored using method 600 above. The method 900 proceeds to step 910, where the method 900 extracts user profile characteristics from the user account that may be used to auto-fill the form-fields when the scanned document is displayed to the user. The method 900 uses the profile field name information from the field table and extracts the information from the user's profile if such information exists. For example, if a field has a profile field name of firstName, the method 900 extracts the user's first name from the user profile characteristics in the field table and provided with the defined field. When all user profile characteristics that are associated with defined form-fields are extracted, the method 900 proceeds to step 912.

At step 912, the method 900 sends the scanned document and the information regarding form-field suggestions and correlations for display to the user. The information for form-field suggestions for a scanned document with six (6) identified fields may be as shown in the table 600 of FIG. 10. FIG. 10 illustrates the information used to create form-fields on a scanned document, according to one or more embodiments. The information includes a record number 1002, a document identifier 1004, a page number 1006, dimensions 1010, a field type 1012, a profile file name 1014, a sequence order 1016, an auto-fill designation 1018, a value 1020, a correlated attachment field 1022, positive correlations 1024, and negative correlations 1026. The fields are similar to those described with respect to FIG. 5 above. In addition, an auto-fill designation 1018 identifies the form-field as a field that should be filled with the value 1020. A correlated attachment 1022 identifies a form-field entry that should be present in the form-field identified in the field for correlated attachment 1022. Similarly, positive correlations 1024 and negative correlations 1026 identify fields that are correlated with the present field. The tabular data in FIG. 10 may be serialized and sent to the client in any form, such as XML, JSON, and the like. Examples of the use of such fields is described in further detail with respect to FIG. 11, below.

The method 900 proceeds to step 916 and ends.

FIGS. 11A-11C illustrate using previous user responses to a scanned document to provide suggestions to a subsequent user of the scanned document, according to one or more embodiments. FIGS. 11A-11C are described in conjunction with the data illustrated in the tables of FIG. 5 and FIG. 10. FIG. 11A illustrates an employment form 1100 that is to be filled out by an employee. The employment form 1100 is a scanned document and therefore does not have any user interactivity built into the document. The employment form 1100 includes a First Name field 1102, a Last Name field 1104, a check box for "Yes" 1106 and a check box for "No" 1108 in order to respond to the question "Do you have a valid driver's license?" The employment form 1100 also includes a field 1110 to enter a driver's license number and a field 1112 where a copy of a driver's license may be attached. A user may enter text anywhere on the scanned form in order to provide responses to the fields.

As shown in FIG. 5, the field 1102 was filled in by two users, namely user1 and user2. Both user1 and user2 entered information for field 1102 that matched their profile field name of "firstName". Similarly, user1 and user2 entered information for field 1104 that matched their profile field name of "lastName". User1 entered a check in checkbox 1106, answering "Yes" to the question, "Do you have a valid driver's license?" User1 also entered text in field 1110, and attached a file in field 1112. User2 entered a check in checkbox 1108, answering "No" to the question, "Do you have a valid driver's license?" From these entries, it can be determined that field 1102 should contain a user's first name and field 1104 should contain a user's last name. In addition, it can be determined that a user who enters a check in checkbox 1106, also enters information in fields 1110 and 1112. Similarly, when a user enters a check in checkbox 1108, the user does not enter any additional information in the remaining fields.

FIG. 11B illustrates the employment form 1100 with suggested locations for entering information, where the suggested locations are based on previous user responses. The bounding box 1114 indicates where previous users entered information. The bounding box 1114 is determined by identifying the bounding boxes of locations where previous users entered information as shown in FIG. 5. Previous users, user1 and user2 entered their firstName information at location [12,34,60,100] and [16,36,64,102], respectively. Because the locations overlap by more than 60%, the information is entered by different users and the field type is the same, the form-field is determined to be the same field. As such, information for the form-field at location [12,34,60,100] on page 1 of document 1100 is included in the information sent to the client, as shown with respect to FIG. 10 above. In addition, because user1 and user2 both entered information that matches the profile field name "firstName", the first name of the present user is extracted from the user's profile characteristics and sent to the client, in this example, as "Franklin". Similarly, the last name field 1116 is determined and filed with the user's last name, in this example, "Smith". Other form-fields 1118 and 1120 are also displayed as suggested locations into which the user may enter information.

FIG. 11C illustrates the employment form 1100 with correlated fields and fields correlated to an attachment, according to one or more embodiments. FIG. 10 illustrates correlations between the form-fields of employment form 1100. The fields 1114, 1116, 1122, 1123, 1124, and 1125 are created based on previous user responses. Further form-fields 1114 and 1116 are filled with user profile characteristic information. The table of FIG. 6 also indicates correlations between fields. As illustrated in FIG. 10, a check in form-field 1122 has a positive correlation to form-fields 1124 and 1126, but has a negative correlation to form field 1123. A check in form-field 1123 has a negative correlation to form-fields 1122, 1124, and 1126. An entry in field 1124 has a correlated attachment to the file attached at field 1126. An entry in field 1124 also has a positive correlation to fields 1122 and 1126 in addition to a negative correlation to field 1123. Lastly, field 1126 has a positive correlation to field 1124. As the user fills out the form, the user indicates in the check box 1122 that the user has a valid driver's license. Due to the positive correlation between the check box 1122 and fields 1124 and 1126. This means that when previous users made an entry in check box 1122, the previous users also entered information at the location of field 1124 and attached a file at the location of field 1126. A positive correlation also exists between field 1124 and field 1126 meaning that the information entered in field 1124 should appear in the file attached to field 1126. Due to the correlation between check box 1122 and fields 1124 and 1126, when the user enters information at check box 1122, the fields 1124 and 1126 are displayed more prominently in order to guide the user to enter information in the fields 1124 and 1126. Because there is a correlation between fields 1124 and 1126, when the user enters information in field 1124, the user's documents, stored both local and in a document repository on a server, are scanned and searched for a word or words that match the entry in field 1124. When one or more documents are found, a list indicating those documents is suggested to the user as a possible attachment. The user may select one of the suggested documents or attach a file of the user's choosing. When the user is done filling out the employment form 1100, the user clicks the "Submit" button 1128. The entries are then validated and the attachment is scanned to ensure that the entry in field 1124 is included in the attachment. If it is not, a warning message is displayed.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
providing, for display, a scanned document via a client device of a current user;
identifying a first location corresponding to where a first previous user entered information via a first form field on a first copy of the scanned document and a second location corresponding to where a second previous user entered additional information via a second form field on a second copy of the scanned document;
identifying a first form field data type, from a set of form field data types comprising a text field data type, a check field data type, and an attachment field data type, corresponding to the information entered via the first form field at the first location on the first copy of the scanned document by the first previous user and a second form field data type, from the set of form field data types, corresponding to the additional information entered via the second form field at the second location on the second copy of the scanned document by the second previous user;
based on a determination that the first form field data type and the second form field data type correspond to the same form field data type and a determination that the first location and the second location overlap by a threshold amount, generating an interactive form field corresponding to the same form field data type for the scanned document;

providing, for display, the interactive form field for the scanned document via the client device of the current user;

identifying one or more interactions with the interactive form field for the scanned document by the current user via the client device of the current user; and based on the one or more interactions with the interactive form field for the scanned document by the current user, determining an additional form field data type for utilization in generating an additional interactive form field for a future user.

2. The method of claim 1, further comprising:

identifying an additional location corresponding to where the first previous user entered further information on the first copy of the scanned document;

generating a second interactive form field for the scanned document based on the additional location; and determining a correlation between the interactive form field and the second interactive form field based on user interactions by the first previous user at the first location on the first copy of the scanned document and user interactions by the first previous user at the additional location on the first copy of the scanned document.

3. The method of claim 1, further comprising:

identifying a previous attachment selected by the first previous user in relation to the first form field at the first location;

determining a suggested attachment for the interactive form field for the scanned document based on the previous attachment selected by the first previous user; and providing, for display, the suggested attachment via the client device of the current user.

4. The method of claim 2, further comprising providing the second interactive form field for display via the client device of the current user based on the correlation between the interactive form field and the second interactive form field.

5. The method of claim 2, further comprising:

generating a rule corresponding to the interactive form field based on the determined correlation between the interactive form field and the second interactive form field, the rule comprising at least one of: displaying a message in response to an interaction with the interactive form field, or completing an action in response to the interaction with the interactive form field; and in response to identifying the interaction with the interactive form field via the client device of the current user, applying the rule by performing at least one of: displaying of the message or completing the action.

6. The method of claim 2, wherein determining the correlation between the interactive form field and the second interactive form field comprises:

identifying text entered by the first previous user in relation to the first location on the first copy of the scanned document; and determining a correspondence between the identified text and attachment text of a previous attachment selected by the first previous user in relation to the additional location on the first copy of the scanned document.

7. The method of claim 6, further comprising:

identifying a current attachment selected by the current user for the second interactive form field for the scanned document; and validating the current attachment based on the determined correlation between the interactive form field and the second interactive form field by comparing text of the interactive form field with attachment text of the current attachment selected by the current user for the second interactive form field.

8. The method of claim 1, wherein identifying the first form field data type comprises identifying the text field data type, and wherein identifying the text field data type comprises determining that the first form field data type is at least one of: a date field data type, a name field data type, or an email address field data type.

9. A system for detecting, validating, and correlating form-fields in scanned documents comprising:

at least one processor; and at least one non-transitory computer readable storage medium storing instructions that, when executed by the at least one processor, cause the system to:

provide, for display, a scanned document via a client device of a current user;

identify a first location of a first form field corresponding to where a first previous user entered information on a first copy of the scanned document and a second location of a second form field corresponding to where a second previous user entered additional information on a second copy of the scanned document; and identify a first form field data type, from a set of form field data types comprising a text field data type, a check field data type, and an attachment field data type, corresponding to the information entered via the first form field at the first location on the first copy of the scanned document by the first previous user and a second form field data type, from the set of form field data types, corresponding to the additional information entered via the second form field at the second location on the second copy of the scanned document by the second previous user;

based on a determination that the first form field data type and the second form field data type correspond to the same form field data type and a determination that the first location and the second location overlap by a threshold amount, generate an interactive form field corresponding to the same form field data type for the scanned document; and provide, for display, the interactive form field for the scanned document via the client device of the current user.

10. The system of claim 9, further comprising instructions that, when executed by the at least one processor, cause the system to:

identify an additional location corresponding to where the first previous user entered further information on the first copy of the scanned document;

generate a second interactive form field for the scanned document based on the additional location; and determine a correlation between the interactive form field and the second interactive form field based on user interactions by the first previous user at the first location on the first copy of the scanned document and user interactions by the first previous user at the additional location on the first copy of the scanned document.

11. The system of claim 10, further comprising instructions that, when executed by the at least one processor, cause the system to provide the second interactive form field for display via the client device of the current user based on the correlation between the interactive form field and the second interactive form field.

12. The system of claim 9, further comprising instructions that, when executed by the at least one processor, cause the system to:
    identify a previous attachment selected by the first previous user in relation to the first location;
    determine a suggested attachment for the interactive form field for the scanned document based on the previous attachment provided by the first previous user; and
    provide, for display, the suggested attachment via the client device of the current user.

13. The system of claim 10, further comprising instructions that, when executed by the at least one processor, cause the system to determine the correlation between the interactive form field and the second interactive form field by:
    identifying text entered by the first previous user in relation to the first location on the first copy of the scanned document; and
    comparing the identified text with a previous attachment selected by the first previous user in relation to the additional location on the first copy of the scanned document.

14. A non-transitory computer readable medium storing instructions that when executed by at least one processor, cause a computer system to:
    provide, for display, a scanned document via a client device of a current user;
    identify a first location corresponding to where a first previous user entered information via a first form field on a first copy of the scanned document and a second location corresponding to where a second previous user entered additional information via second form field on a second copy of the scanned document; and
    identify a first form field data type, from a set of form field data types comprising a text field data type, a check field data type, and an attachment field data type, corresponding to the information entered via the first form field at the first location on the first copy of the scanned document by the first previous user and a second form field data type, from the set of form field data types, corresponding to the additional information entered via the second form field at the second location on the second copy of the scanned document by the second previous user;
    based on a determination that the first form field data type and the second form field data type correspond to the same form field data type and a determination that the first location and the second location overlap by a threshold amount, generate an interactive form field corresponding to the same form field data type for the scanned document;
    provide, for display, the interactive form field for the scanned document via the client device of the current user;
    identify one or more interactions with the scanned document by the current user via the client device of the current user; and
    based on the one or more interactions with the scanned document by the current user, determine an additional form field data type for the scanned document for utilization in generating an additional interactive form field for a future user.

15. The non-transitory computer readable medium of claim 14, further comprising instructions, that when executed by the at least one processor, cause the computer system to:
    identify an additional location corresponding to where the first previous user entered further information on the first copy of the scanned document;
    generate a second interactive form field for the scanned document based on the additional location; and
    determine a correlation between the interactive form field and the second interactive form field based on user interactions by the first previous user at the first location on the first copy of the scanned document and user interactions by the first previous user at the additional location on the first copy of the scanned document.

16. The non-transitory computer readable medium of claim 15, further comprising instructions that, when executed by the at least one processor, cause the computer system to provide the second interactive form field for display via the client device of the current user based on the correlation between the interactive form field and the second interactive form field.

17. The non-transitory computer readable medium of claim 14, further comprising instructions that, when executed by the at least one processor, cause the computer system to:
    identify a previous attachment selected by the first previous user in relation to the first form field at the first location;
    determine a suggested attachment for the interactive form field for the scanned document based on the previous attachment provided by the first previous user; and
    provide, for display, the suggested attachment via the client device of the current user.

18. The non-transitory computer readable medium of claim 15, further comprising instructions that, when executed by the at least one processor, cause the computer system to:
    generate a rule corresponding to the interactive form field based on the determined correlation between the interactive form field and the second interactive form field, the rule comprising at least one of: displaying a message in response to an interaction with the interactive form field, or completing an action in response to the interaction with the interactive form field; and
    in response to identifying the interaction with the interactive form field via the client device of the current user, apply the rule by performing at least one of: displaying of the message or completing the action.

19. The non-transitory computer readable medium of claim 15, further comprising instructions that, when executed by the at least one processor, cause the computer system to determine the correlation between the interactive form field and the second interactive form field by:
    identifying text entered by the first previous user in relation to the first location on the first copy of the scanned document; and
    comparing the identified text with attachment text of a previous attachment selected by the first previous user in relation to the additional location on the first copy of the scanned document.

20. The non-transitory computer readable medium of claim 19, further comprising instructions that, when executed by the at least one processor, cause the computer system to:

identify a current attachment selected by the current user in relation to the second interactive form field for the scanned document; and validate the current attachment based on the determined correlation between the interactive form field and the second interactive form field by comparing text of the interactive form field with the current attachment selected by the current user in relation to the second interactive form field.

* * * * *